US012373375B2

(12) United States Patent
Chang et al.

(10) Patent No.: US 12,373,375 B2
(45) Date of Patent: Jul. 29, 2025

(54) MAGNETIC SUCTION STORAGE DEVICE

(71) Applicant: TEAM GROUP INC., New Taipei (TW)

(72) Inventors: Chin Feng Chang, New Taipei (TW); Hsun Chia Ma, New Taipei (TW); Yu Che Cheng, New Taipei (TW)

(73) Assignee: TEAM GROUP INC., New Taipei (TW)

( * ) Notice: Subject to any disclaimer, the term of this patent is extended or adjusted under 35 U.S.C. 154(b) by 0 days.

(21) Appl. No.: 18/655,891

(22) Filed: May 6, 2024

(65) Prior Publication Data

US 2025/0130968 A1 Apr. 24, 2025

Related U.S. Application Data

(60) Provisional application No. 63/545,217, filed on Oct. 23, 2023.

(51) Int. Cl.
*G06F 13/40* (2006.01)
*G06F 1/26* (2006.01)

(52) U.S. Cl.
CPC ............ *G06F 13/409* (2013.01); *G06F 1/266* (2013.01)

(58) Field of Classification Search
CPC .............................. G06F 13/409; G06F 1/266
See application file for complete search history.

(56) References Cited

U.S. PATENT DOCUMENTS

| | | | |
|---|---|---|---|
| 2010/0220435 A1* | 9/2010 | Fahey | G06F 1/1632 361/679.32 |
| 2015/0172431 A1* | 6/2015 | Huang | H04B 1/3883 455/575.8 |
| 2018/0131148 A1* | 5/2018 | Liu | G05B 15/02 |
| 2023/0157430 A1* | 5/2023 | Backus | A45C 13/1069 150/149 |

* cited by examiner

*Primary Examiner* — Farley Abad
(74) *Attorney, Agent, or Firm* — WPAT, PC

(57) ABSTRACT

The present invention provides a magnetic suction storage device that is adsorbed on a mobile device. A first through hole and a second through hole are drilled through one side of a first housing of the magnetic storage device, and a first magnetic element is disposed on the inside of the first housing, a base plate of a storage module is disposed above one of the first magnetic components, and a storage element, a first control element and a second control element are disposed above the base plate. An outer edge of the substrate is provided with a first connection port and a second connection port, and an outer edge of a second shell is connected to an outer edge of the first shell, so that the second shell and the first shell The body covers the first magnetic component and the storage module.

9 Claims, 7 Drawing Sheets

MAGNETIC SUCTION STORAGE DEVICE

BACKGROUND OF THE INVENTION

With the development of mobile device technology, mobile devices are not only tools for calls and text messages but also portable entertainment devices, office devices, cameras, etc. However, what follows is an increasingly large number of applications, high-definition photos and videos, which make the storage space of mobile devices somewhat overwhelming. In response to this demand, more users are turning to external storage devices to meet their expanding data collection and usage needs.

The space occupied by the system and applications contained in mobile devices is constantly growing. Mobile device system updates often take up considerable storage space, and various applications have also become more sophisticated by providing more functions and a better user experience. For example, for game applications, their graphics and sound effects are becoming more sophisticated, so they require more space, and users usually store a large amount of music, videos, documents, etc., which makes the internal storage space insufficient in a short time.

On the other hand, with the improvement of the photographing functions of mobile devices, the frequency of users taking photos and recording videos is gradually increasing. Although high-pixel photos and high-definition videos provide a better visual experience, they also occupy a large amount of storage space. Many people may habitually keep a large number of photos and videos, which poses a greater challenge to the storage capacity of mobile devices.

In order to solve this problem, external storage devices have become the first choice for more mobile device users. There are various types of external storage devices, comprising flash drives, external hard drives, high-capacity SD memory cards, etc. They provide additional storage space, allowing users to expand the capacity of their mobile devices at any time.

However, according to the prior art, when not in use, the external storage devices need to be stored in separate storage spaces, such as backpacks, pockets, etc., increasing the trouble of use. When the mobile device is used, such as taking photos and videos, the external storage devices according to the prior art cannot be fixed. The data of the mobile device can only be connected and stored when the mobile device is placed still, inducing trouble in use.

To solve the above problem in the prior art, the present invention provides a magnetic suction storage device, which uses a magnetic element to attract the whole magnetic device to a mobile device. Thereby, the storage device can move along with the mobile device and store the data of the mobile device at any time.

SUMMARY OF THE INVENTION

An objective of the present invention is to provide a magnetic suction device. A magnetic element is disposed on the housing of the storage device. The magnetic element attracts the storage device to a mobile device so that the storage device can move along with the mobile device and store the data of the mobile device at any time. Furthermore, the storage device can be connected to an external power supply for supplying power to the mobile device.

To achieve the above objective and efficacy, the present invention provides a magnetic suction storage device, which is attracted to a mobile device. The magnetic suction storage device comprises a first housing, a first magnetic element, a storage module, and a second housing. A first through hole and a second through hole pass through one side of the first housing. The second through hole is adjacent to the first through hole. The first magnetic element is disposed on an inner side of the first housing. The storage module includes a substrate, a storage device, a first control device, a second control device, a first connection port, and a second connection port. The substrate is disposed on the first magnetic element. The storage device is disposed on the substrate. The first control device is disposed on the substrate. The first control device is connected electrically to the storage device. The second control device is disposed on the substrate. The first connection port is disposed on an outer edge of the substrate and connected electrically to the first control device and the second control device. The first connection port passes through the first through hole. The second connection port is adjacent to the first connection port and disposed on the outer edge of the substrate. The second connection port is connected electrically to the second control device. The second connection port passes through the second through hole. An outer edge of the second housing is connected to an outer edge of the first housing such that the second housing and the first housing envelop the first magnetic element and the storage module. The first magnetic element is attracted to the mobile device so that the magnetic suction storage device is magnetically fixed to the mobile device. The first control device transmits a data signal of the storage device to the mobile device via the first connection port and receives the first electrical energy. The second control device receives the second electrically energy via the second connection port. Besides, the second control device transmits the second energy to the first connection port and to the mobile device for charging the mobile device. Then a storage device magnetically attracted to a mobile device can be provided.

According to an embodiment of the present invention, a limit groove is disposed on the first housing and the first magnetic element is embedded in the limit groove.

According to an embodiment of the present invention, the storage module further includes a first screw member passing though the substrate and screwed to the first housing.

According to an embodiment of the present invention, the magnetic suction storage device further comprises a second screw member and a decorative plate. The second screw member passes through the second housing and the first housing to connect the second housing and the first housing. The decorative plate is disposed on the second housing and covers the second screw member.

According to an embodiment of the present invention, the first magnetic element is exposed below the first housing.

According to an embodiment of the present invention, the magnetic suction storage device further comprises an insulative member and a thermally conductive member. The insulative member is disposed between the first housing and the storage module and is the MYLAR. The thermally conductive member is disposed between the storage module and the second housing and is the graphene.

According to an embodiment of the present invention, the mobile device includes a second magnetic element attracted to the first magnetic element correspondingly.

According to an embodiment of the present invention, the substrate is one of the circuit boards for Type-C USB3.2 and SSD.

According to an embodiment of the present invention, the first housing is plastic or metal.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

To solve the above problem in the prior art, the present invention provides a magnetic suction storage device attracted to a mobile device. A first magnetic element of the magnetic suction storage device is disposed on an inner side of the first housing. A storage module is disposed on the first magnetic element. An outer edge of a second housing is connected to an outer edge of the first housing such that the second housing and the first housing envelop the first magnetic element and the storage module. To install, the first magnetic element is attracted to the mobile device so that the magnetic suction storage device can be fixed to the mobile device. Thereby, the usage problem of requiring additional storage space according to the prior art can be solved.

Figure 1:
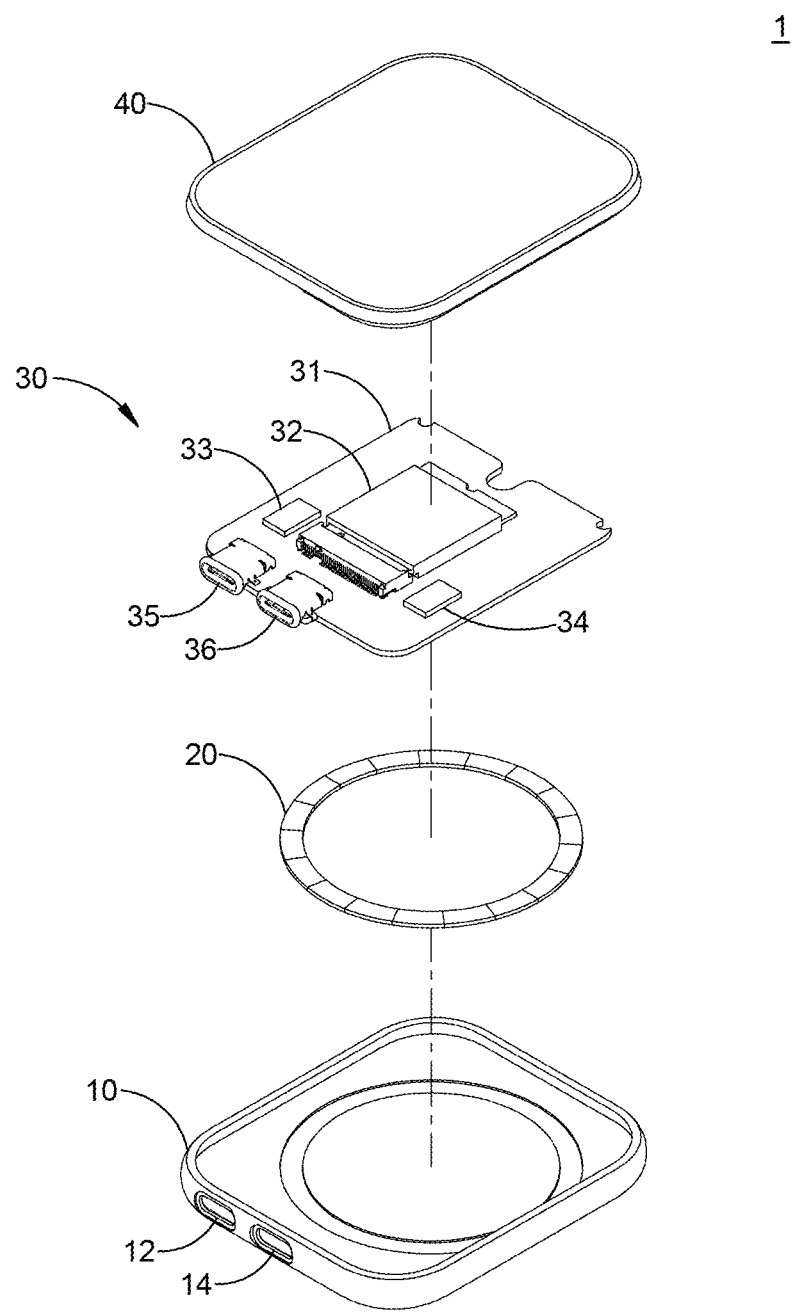
FIG. 1 shows an exploded view of the structure according to an embodiment of the present invention.

Please refer to FIG. 1, which shows an exploded view of the structure according to an embodiment of the present invention. As shown in the figure, the present invention is the first embodiment. The present embodiment provides a magnetic suction storage device 1, which is attracted to a mobile device 2. The magnetic suction storage device 1 comprises a first housing 10, a first magnetic element 20, a storage module 30, and a second housing 40. According to the present embodiment, the mobile device 2 is, but not limited to, a smartphone.

Figure 2A:
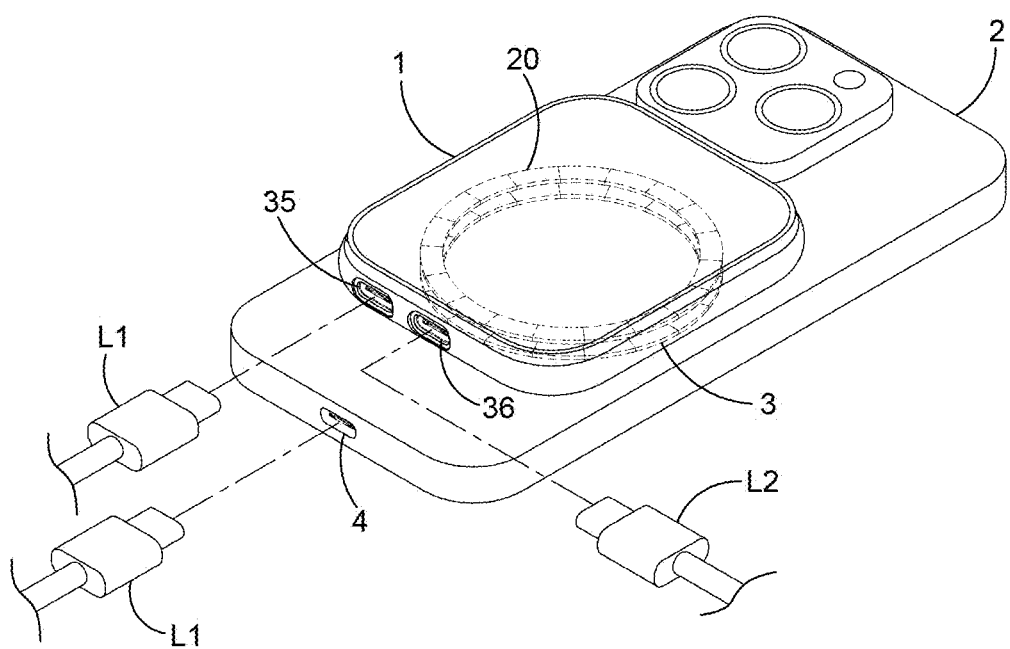
FIG. 2A to FIG. 2B show schematic diagrams of magnetically attracting to a mobile device according to an embodiment of the present invention.
Figure 2B:
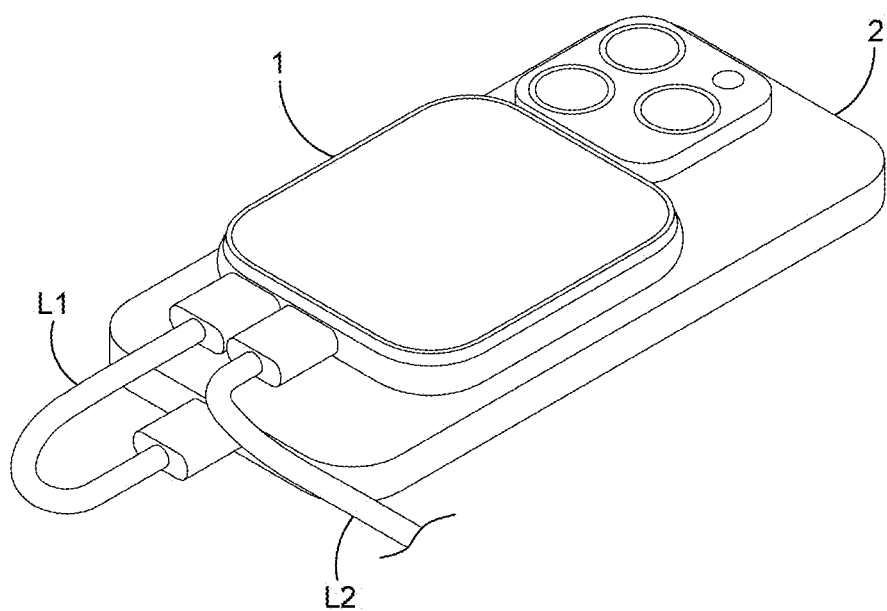
Figure 3:
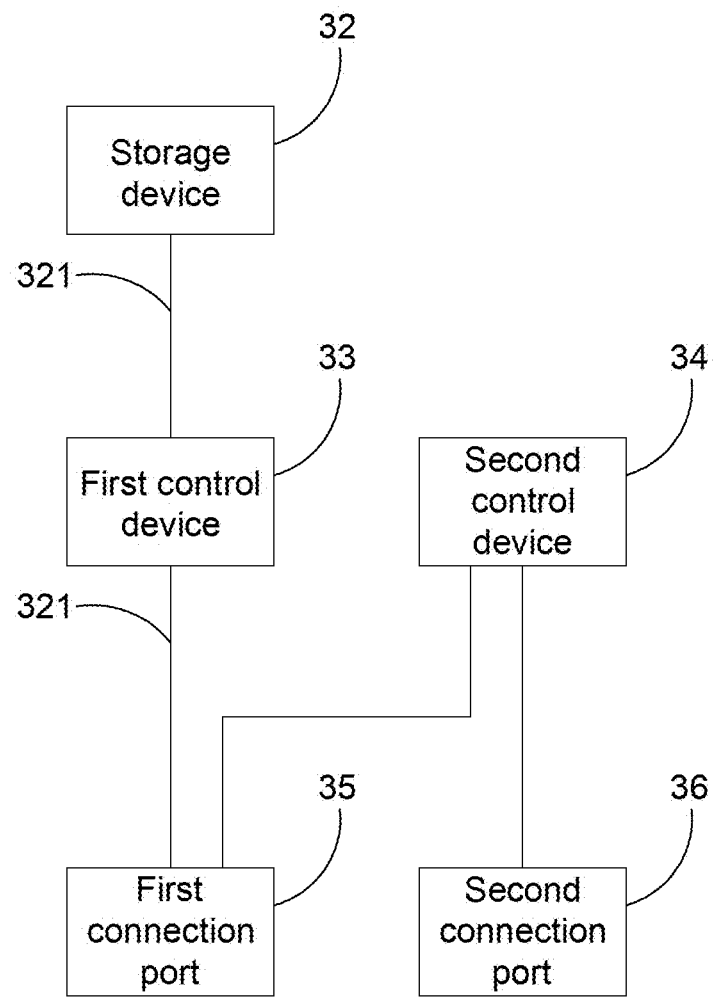
FIG. 3 shows a schematic diagram of electrical connection according to an embodiment of the present invention.

Please refer to FIG. 1 again and to FIG. 2A, FIG. 2B, and FIG. 3. FIG. 2A to FIG. 2B show schematic diagrams of magnetically attracting to a mobile device according to an embodiment of the present invention; FIG. 3 shows a schematic diagram of electrical connection according to an embodiment of the present invention. As shown in the figures, according to the present embodiment, a first through hole 12 and a second through hole 14 pass through one side of the first housing 10. The second through hole 14 is adjacent to the first through hole 12. The first magnetic element 20 is embedded on the first housing 10. The storage module 30 is disposed on the first housing 10. The storage module 30 includes a substrate 31, a storage device 32, a first control device 33, a second control device 34, a first connection port 35, and a second connection port 36. The substrate 31 is disposed on the first magnetic element 20. The storage device 32 is disposed on the substrate 31. The first control device 33 is disposed on the substrate 31. The first control device 33 is connected electrically to the storage device 32. The second control device 34 is disposed on the substrate 31. The first connection port 35 is disposed on an outer edge of the substrate 31 and connected electrically to the first control device 33 and the second control device 34.

The first connection port 35 passes through the first through hole 12, so that the external circuit can be connected to the first connection port 35 via the first through hole 12. The second connection port 36 is adjacent to the first connection port 35 and disposed on the outer edge of the substrate 31. The second connection port 36 is connected electrically to the second control device 34. The second connection port 36 passes through the second through hole 14, so that the external circuit can be connected to the second connection port 36 via the second through hole 14. An outer edge of the second housing 40 is connected to an outer edge of the second housing 10 such that the second housing 40 and the first housing 10 envelop the first magnetic element 20 and the storage module 30.

As shown in FIG. 2A, FIG. 2B, and FIG. 3, according to the present embodiment, while disposing the magnetic suction storage device 1, the first magnetic element 20 is attracted to the mobile device 2 and spaced by the first housing 10. Thereby, the first housing 10 is sandwiched by the first magnetic element 20 and the mobile device 2 and thus fixing magnetically the magnetic suction storage 1 to the mobile device 2. After disposing the magnetic suction storage device 1, the first control device 33 transmits a storage signal 321 of the storage device 32 to the mobile device 2 via the first connection port 2, and receives the first electrical energy from the mobile device 2 or stores the storage signal 321 of the mobile device 2 to the storage device 32. The electrical energy required by the magnetic suction storage device 1 is provided by the mobile device 2. The second control device 34 receives the second electrical energy via the second connection port 36. In addition, the second control device 34 transmits the second electrical energy to the first connection port 35. Then the second control device 34 transmits the second electrical energy to the mobile device 2 via the first connection port 35 for charging.

According to an embodiment, a first line L1 is further connected electrically to a device connected port 4 of the mobile device 2 and a second line L2 is connected electrically to the second connection port 36 and a power supply. The power supply is an external power supply, for example, but not limited to, the grid power or a mobile power pack.

According to an embodiment, the first housing 10 a metal material. Furthermore, it is a magnetic material for increasing the magnetic attraction of the first magnetic element 20.

According to an embodiment, the mobile device 2 includes a second magnetic element 3. The magnetic element 3 is attracted to the first magnetic element 20 correspondingly such that the magnetic suction storage device 1 can attracted and aligned to the mobile device 2 automatically.

According to an embodiment, the first magnetic element 20 is exposed below the first housing 10 for attracting magnetically to the mobile device 2 directly.

According to an embodiment, the substrate 31 is a PCIe M.2 2230 circuit board for shrinking the size of the substrate 31 and adapting to the mobile device 2. Alternatively, according to an embodiment, the substrate 31 can be a Type-C USB3.2 circuit board or a PCIe M.2 2242 circuit board. Nonetheless, the resent invention is not limited to the embodiments.

When a mobile device according to the prior art (such as the mobile device 2) is in use and needs to transmit videos or photos or to backup data, a transmission line (the first line L1) is adopted to transmit data via the first connection port 35. Unfortunately, since the mobile device according to the prior art has only one connection port, it cannot be charged while accessing data. Thereby, according to the present embodiment, the other transmission line (the second line L2) can be used to connect electrically to the power supply and the second connection port 36. At this moment, the second control device 34 can transmit the electrical energy to the first connection port 35 via the second connection port 36. Then the first connection port 35 can charge the mobile device and thus achieving the efficacy of concurrent data transmission and charging.

Figure 4:
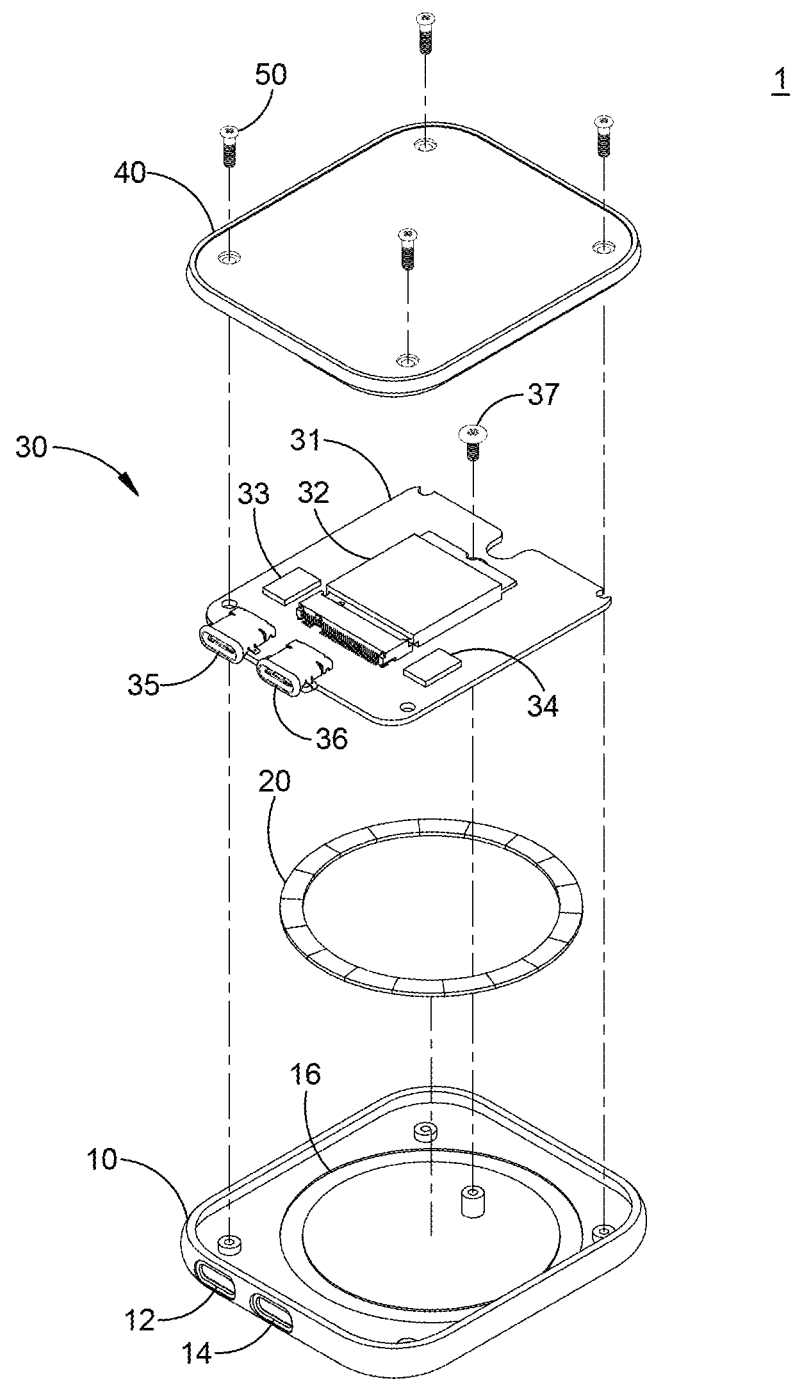
FIG. 4 shows an exploded view of the screw structure according to an embodiment of the present invention.

Please refer to FIG. 4, which shows an exploded view of the screw structure according to an embodiment of the present invention. As shown in the figure, the present embodiment is based on the first embodiment described above. According to the present embodiment, a limit groove 16 is disposed on the first housing 10. The first magnetic element 20 is embedded in the limit groove 16 for fixing the magnetic element 20. For example, when the first hosing 10 is a plastic material, the first magnetic element 20 is further buried on the inner side of the limit groove 16. The plastic material will envelop the first magnetic element 20. When the first housing 10 is a metal material, the first magnetic element 20 will be exposed and disposed in the limit groove 16. Besides, an insulative plate will be disposed for isolating the first magnetic element 20 from the storage module 30.

According to an embodiment, the storage module 30 further includes a first screw member 37 passing though the substrate 31 and screwed to the first housing 37.

According to an embodiment, the magnetic suction storage device 1 further comprises a second screw member 50 passing through the second housing 40 and the first housing 10 to connect the second housing 40 and the first housing 10.

According to an embodiment, the number of the second screw member 50 is plural for fixing the second housing 40 to the first housing 10. Nonetheless, the present invention is not limited to the embodiment.

According to an embodiment, an insulative member is further disposed between the first magnetic element 20 and the substrate 31 for avoiding short circuit therebetween.

Figure 5:
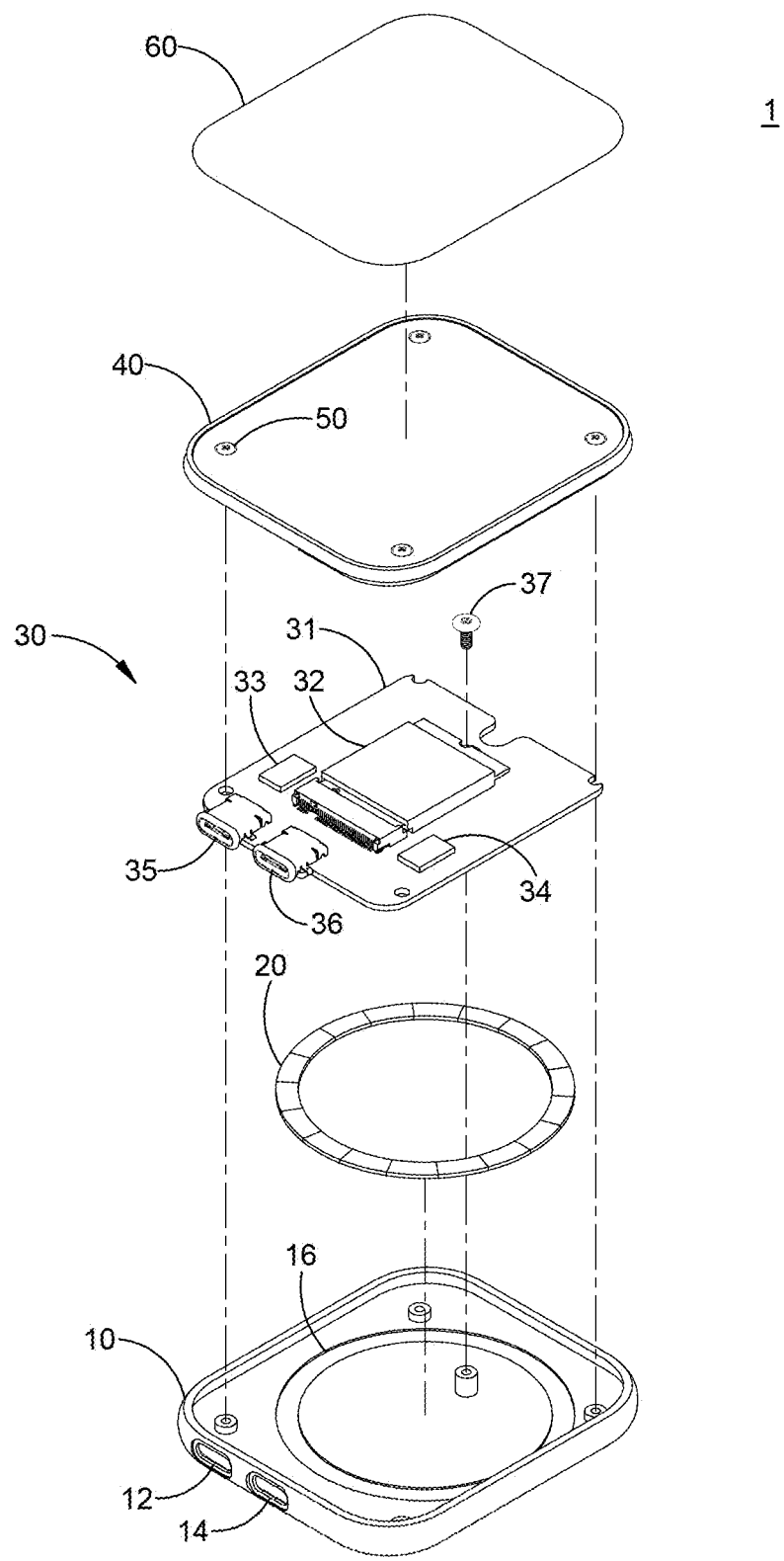
FIG. 5 shows an exploded view of the decorative plate structure according to an embodiment of the present invention.

Please refer to FIG. 5, which shows an exploded view of the decorative plate structure according to an embodiment of the present invention. As shown in the figure, the present embodiment is based on the first embodiment described above. According to the present embodiment, the magnetic suction storage device further comprises a decorative plate 60 disposed on the second housing 40. The decorative plate 60 covers the second screw member 50 for protecting the second screw member 50 and decoration.

Figure 6:
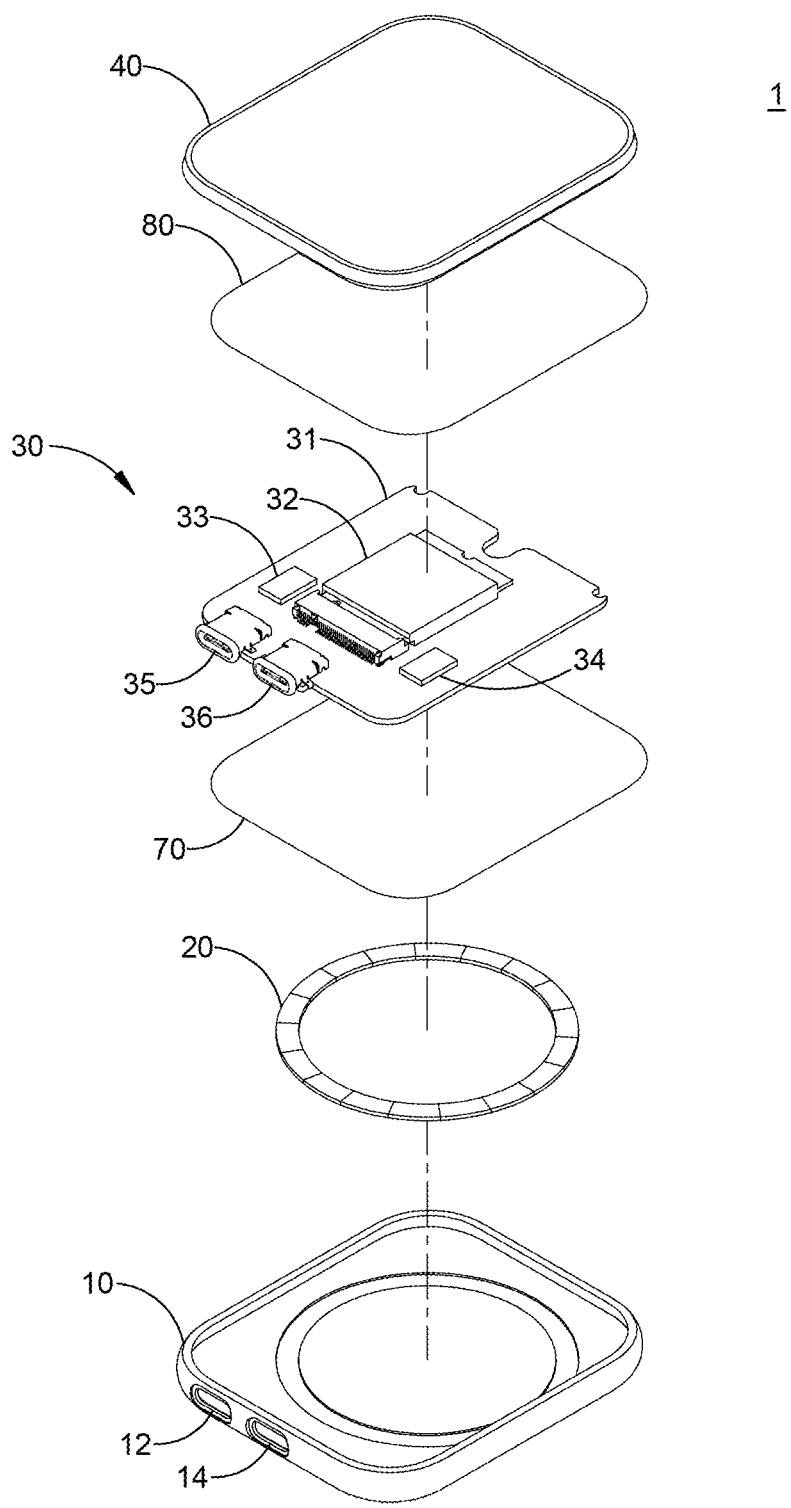
FIG. 6 shows an exploded view of other components according to an embodiment of the present invention.

Please refer to FIG. 6, which shows an exploded view of other components according to an embodiment of the present invention. As shown in the figure, the present embodiment is based on the first embodiment described above. According to the present embodiment, the magnetic suction storage device further comprises an insulative member 70 and a thermally conductive member 80. The insulative member 70 is disposed between the first housing 10 and the storage module 30. The thermally conductive member 80 is disposed between the storage module 30 and the second housing 40. According to the present embodiment, the insulative member 70 is, but not limited to, the MYLAR for isolating the first housing 10 from the storage module 30 and avoiding short circuit. The thermally conductive member 80 is, but not limited to, the graphene for improving heat dissipation efficiency.

According to an embodiment, only one of the insulative member 70 and the thermally conductive member 80 is adopted. Nonetheless, the present invention is not limited to the embodiment.

To sum up, the present invention provides a magnetic suction storage device, which adopts a magnetic element on the housing of the device. The magnetic element can attract the whole storage device to a mobile device, enabling the storage device to move along with the mobile device and store the data in the mobile device at any time. Furthermore, the storage device is connected to an externa power supply for charging the mobile device. The present invention solves the problem of requiring an additional space for storing the external storage device according to the prior art. It also solves the trouble of inability of connecting to and storing the data in the mobile device unless the mobile device is static because the external storage device cannot be fixed.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A magnetic suction storage device, attracted to a mobile device, and comprising:
    a first housing, having a first through hole and a second through hole passing through one side of said first housing, and said second through hole adjacent to said first through hole;
    a first magnetic element, disposed on an inner side of said first housing;
    a storage module, comprising:
        a substrate, disposed on the said magnetic element;
        a storage device, disposed on said substrate;
        a first control device, disposed on said substrate, and connected electrically to said storage device;
        a second control device, disposed on said substrate;
        a first connection port, disposed on an outer edge of said substrate, connected electrically to said first control device and said second control device, and said first connection port passing through said first through hole; and
        a second connection port, adjacent to said first connection port, disposed on the outer edge of said substrate, connected electrically to said second control device, and passing through said second through hole; and
    a second housing, having an outer edge connected to an outer edge of said first housing such that said second housing and said first housing envelop said first magnetic element and said storage module;
    wherein said first magnetic element is attracted to said mobile device so that said magnetic suction storage device is magnetically fixed to said mobile device; said first control device transmits a data signal of said storage device to said mobile device via said first connection port and receives the first electrical energy; said second control device receives the second electrically energy via said second connection port; and said second control device transmits said second energy to said first connection port and to said mobile device for charging said mobile device.

2. The magnetic suction storage device of claim 1, wherein a limit groove is disposed on said first housing and said first magnetic element is embedded in said limit groove.

3. The magnetic suction storage device of claim 1, wherein said storage module further includes a first screw member passing though said substrate and screwed to said first housing.

4. The magnetic suction storage device of claim 1, and further comprising a second screw member and a decorative plate, said second screw member passing through said second housing and said first housing to connect said second housing and said first housing, and said decorative plate disposed on said second housing and covering said second screw member.

5. The magnetic suction storage device of claim 1, wherein said first magnetic element is exposed below said first housing.

6. The magnetic suction storage device of claim 1, and further comprising an insulative member and a thermally conductive member, said insulative member disposed between said first housing and said storage module, and said thermally conductive member disposed between said storage module and said second housing and being graphene.

7. The magnetic suction storage device of claim 1, wherein said mobile device includes a second magnetic element attracted to said first magnetic element correspondingly.

8. The magnetic suction storage device of claim 1, wherein said substrate is one of the circuit boards for Type-C USB3.2 and SSD.

9. The magnetic suction storage device of claim 1, wherein said first housing is plastic or metal.

* * * * *